(12) United States Patent
Sugiura (10) Patent No.: US 7,953,185 B2
(45) Date of Patent: May 31, 2011

(54) RECEIVING UNIT OF VEHICLE COMMUNICATION SYSTEM

(75) Inventor: Masahiro Sugiura, Takahama (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1036 days.

(21) Appl. No.: 11/802,986

(22) Filed: May 29, 2007

(65) Prior Publication Data

US 2008/0008253 A1 Jan. 10, 2008

(30) Foreign Application Priority Data

Jun. 21, 2006 (JP) ................... 2006-171734

(51) Int. Cl.
*H04L 27/06* (2006.01)
(52) U.S. Cl. .................. 375/340; 375/243; 375/342
(58) Field of Classification Search .................. 375/316, 375/243, 340, 342; 340/825.69
See application file for complete search history.

(56) References Cited

U.S. PATENT DOCUMENTS

| | | | |
|---|---|---|---|
| 5,003,196 A | | 3/1991 | Kawaguchi |
| 5,402,063 A | * | 3/1995 | Kim ........................... 324/158.1 |
| 5,710,548 A | * | 1/1998 | LeMense ................. 340/825.69 |
| 5,835,022 A | | 11/1998 | Amano |
| 6,670,883 B1 | | 12/2003 | Asakura et al. |
| 2004/0194003 A1 | | 9/2004 | Kwon |

FOREIGN PATENT DOCUMENTS

| | | |
|---|---|---|
| JP | 1-132242 | 5/1989 |
| JP | 2000-170420 | 6/2000 |
| JP | 2000-307465 | 11/2000 |
| KR | 2000-0015030 | 3/2000 |

OTHER PUBLICATIONS

Office Action issued on Jan. 9, 2008 in DE Application No. 102007028221.6 with English translation.
Werner, Martin, "Information and Codierung," 2002, Braunschweig, Vieweg-Verlag, ISBN: 3-528-03951-5, S. 79-83, with partial English translation.
Korean Notice of Invitation to Submit Opinion (Office Action) dated Aug. 25, 2008 issued in counterpart Korean Application 10-2007-0060493 with English translation.

* cited by examiner

*Primary Examiner* — Temesghen Ghebretinsae
(74) *Attorney, Agent, or Firm* — Nixon & Vanderhye PC (57) ABSTRACT

A vehicle communication system has a receiving unit on a vehicle side for inputting a demodulated analog signal to determination units based on a received radio signal from a key unit. Then, one of the two determination units outputs a high-check signal that takes a high value when the analog signal is greater than a high threshold and the other determination unit outputs a low-check signal that takes a low value when the analog signal is smaller than a low threshold. Then, a sync. signal generator successively defines a determination period based on the high and low check signals. Then, a binary level of the analog signal is determined by a level determination unit based on the check signals, along with an estimation and a correction of an indefinite signal when the signal level cannot be determined based on a coding rule and the determination by the determination units.

7 Claims, 11 Drawing Sheets

| LATTER HALF OF PREV. bit | CORRECTION PERIOD | CORRECTED RESULT |
|---|---|---|
| H | INDEF. | INDEF. →L |
| L | INDEF. | INDEF. →H |

FIG. 5B

| CORRECTION PERIOD | FORMER HALF OF NEXT bit | CORRECTED RESULT |
|---|---|---|
| INDEF. | H | INDEF. →L |
| INDEF. | L | INDEF. →H |

| PERIOD NO. | [1] | [2] | [3] | [4] | [5] | [6] | [7] | [8] |
|---|---|---|---|---|---|---|---|---|
| DATA LEVEL CHECK RESULT | H | L | H | INDEF.→H | L | H | L | L |
| bit | 0 | | 1 | | 0 | | 1 | |

FIG. 6B

| PERIOD NO. | [1] | [2] | [3] | [4] | [5] | [6] | [7] | [8] |
|---|---|---|---|---|---|---|---|---|
| DATA LEVEL CHECK RESULT | L | H | H | INDEF.→L | L | H | H | L |
| bit | 0 | | 1 | | 0 | | 1 | |

| PREV. PERIOD | CORRECTION PERIOD | NEXT PERIOD | CORRECTED RESULT |
|---|---|---|---|
| H | INDEF. | H | INDEF. →L |
| L | INDEF. | L | INDEF. →H |

FIG. 9B

| PREV. PERIOD | CORRECTION PERIOD | NEXT PERIOD | AFTER-NEXT PERIOD | CORRECTED RESULT |
|---|---|---|---|---|
| L | INDEF. | H | H | INDEF. →L |
| H | INDEF. | L | L | INDEF. →H |

FIG. 9C

| [1] | [2] | [3] | [4] | CHECK RESULT |
|---|---|---|---|---|
| H | L | L | H | 2 CENTER PERIODS=1 bit (1) |
| L | H | H | L | 2 CENTER PERIODS=1 bit (1) |
| H | H | L | L | bit DIVISION IN MIDDLE (1→1) |
| H | H | L | H | bit DIVISION IN MIDDLE (1→0) |
| L | L | H | H | bit DIVISION IN MIDDLE (1→1) |
| L | L | H | L | bit DIVISION IN MIDDLE (1→0) |
| H | L | H | H | bit DIVISION IN MIDDLE (0→1) |
| L | H | L | L | bit DIVISION IN MIDDLE (0→1) |

RECEIVING UNIT OF VEHICLE COMMUNICATION SYSTEM

CROSS REFERENCE TO RELATED APPLICATION

This application is based on and claims the benefit of priority of Japanese Patent Application No. 2006-171734 filed on Jun. 21, 2006, the disclosure of which is incorporated herein by reference.

FIELD OF THE INVENTION

The present invention generally relates to a vehicle communication system for use in a vehicle.

BACKGROUND INFORMATION

In recent years, various techniques of communication between a vehicle unit and a portable unit are used as a key-less entry system, a smart entry system and the like, and these systems use a radio signal transmitted from the portable unit and received by the vehicle unit for authenticating a unique digital data extracted from the radio signal to, for example, open a door of the vehicle by activating an actuator. (Refer to, for example, Japanese Patent Documents JP-A-H09-41754, JP-A-2000-170420, JP-A-2001-98810) (Contents of JP-A-H09-41754 and JP-A-2001-98810 are published as US patent documents identified as U.S. Pat. Nos. 5,835,022, and 6,670,883)

On the transmission side unit of these systems, Biphase code or Manchester code is used to encode digital data (NRZ format data) for transmission, and the encoded digital data is used to modulate the radio signal that is to be transmitted from an antenna by using a carrier wave in, for example, the UHF band. Therefore, on the reception side of the system, the radio signal is received and de-modulated for decoding the digital data by determining whether a binary level of the de-modulated analog signal is high or low. In this manner, the digital data is transmitted and restored (i.e., being played back).

Figure 12A:
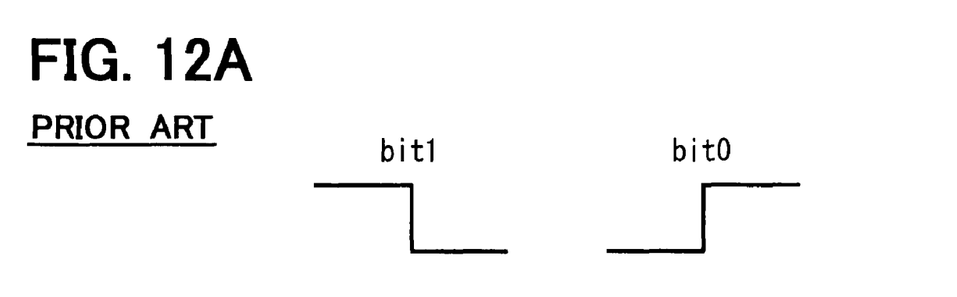
FIGS. 12A and 12B show wave forms of Manchester coding and Biphase coding.

As shown in FIG. 12A, in the Manchester coding, a data bit of 1 having a logical value of 1 and a data bit of 0 having a logical value of 0 are distinguished by examining a rise (i.e., a change from a low level to a high level) or a fall (i.e., a change from a high level to a low level) in the middle of one bit period. Therefore, for example, the bit1 in the Manchester coding is encoded as the fall signal in the one bit period, and the bit0 is encoded as the rise signal in the one bit period.

Figure 12B:
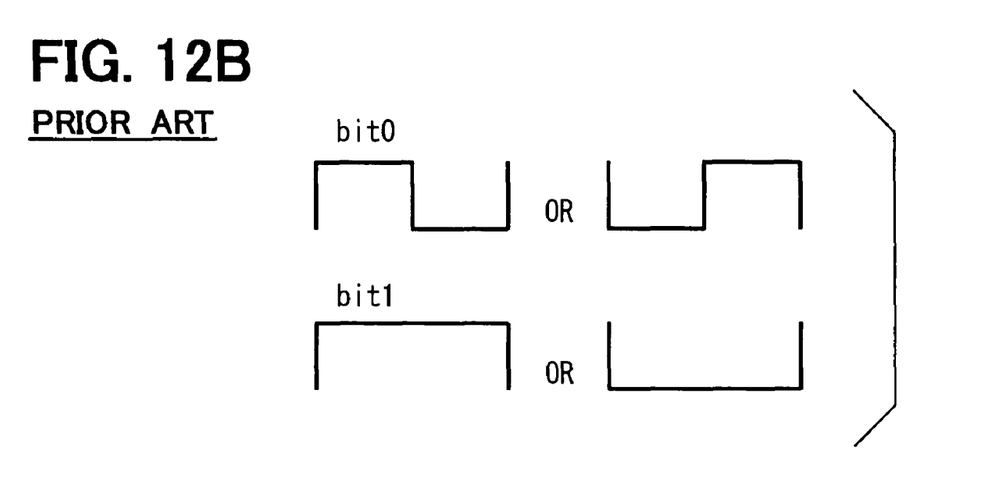

Further, as shown in FIG. 12B, in the Biphase coding, the data bit of 0 is coded as a signal that inverts its (high-low) level in the middle of the one bit period, an the bit of 1 is coded as a signal that inverts its high-low level at an end of the one bit period, with an additional inversion of the signal level of each bit that a high-level ending of the previous bit is succeeded by a low-level start of the next bit, and a low-level ending of the previous bit is succeeded by the high-level start of the next bit.

Therefore, in both of the Manchester coding and the Biphase coding, each bit of the digital data is coded as a signal that has at least one binary level change between the high level and the low level in the middle of the bit or at the end of the bit. Further, due to the scheme of coding described above, the clock of the signal can be restored from the digital signal after coding.

The vehicle communication system having the above-described coding scheme may possibly have a distorted wave form in the demodulated analog signal received and demodulated by the receiving side unit relative to the original data due to an external noise or the like. The distorted wave form on the receiving side unit may lead to a mis-determination of the binary signal level in the demodulated analog signal, thereby yielding an erroneous logical value as the result of the decoding of the original digital data.

SUMMARY OF THE INVENTION

In view of the above and other problems, the present invention provides a receiving unit of a vehicle communication system that prevents a logical value determination error in received data even when a waveform of the demodulated analog signal is distorted under an influence of a noise or the like.

The receiving unit of the vehicle communication system receives the digital signal that modulates a carrier wave by using a specific coding method for transmitting digital data from a transmitter of the communication system. The coding method for coding the digital data changes the high and the low of the binary level of data bit at at least one of an inside of the bit and a division (i.e., a beginning edge and an ending edge) of the bit.

Therefore, the receiving unit receives the radio signal from the transmitter for demodulation, and restores the digital data by determining the high and the low of the binary level from the demodulated analog signal. The receiving unit includes a first signal output unit, a second signal output unit, a determination signal output unit, a level decision unit, and a level correction unit for determining the binary level of the analog signal.

The first signal output unit compares the analog signal and the threshold for hi-level check, and outputs the hi-check signal that is in an active level when the analog signal is higher in level than the threshold. The second signal output unit compares the analog signal and the threshold for lo-level check, and outputs the lo-check signal that is in an active level when the analog signal is lower in level than the threshold.

The determination period determination unit successively determines a determination period for determining the binary level of the analog signal based on the hi-check signal and the lo-check signal.

The level decision unit determines the binary level of the analog signal in each of the check periods that are determined by the determination period determination unit, and determines the level of the analog signal as indefinite when the binary level cannot be determined. Further, the level correction unit corrects the indefinite level to have one of the high or the low binary levels based on an estimation derived from the check result of the decision unit and the method of coding.

In this manner, the level decision unit determines the binary level of the analog signal based on the thresholds of the hi-check signal and the threshold of the lo-check signal, thereby enabling a more accurate determination of the binary level of the digital data than a determination method that simply compares the analog signal with one threshold that divides the value into highs and lows.

Further, the indefinite level of the digital data in a certain check period may be corrected to have the high or the low binary level based on the check result in other check periods and the rule of the coding method, thereby enabling an accurate restoration of the digital data from a distorted wave form of the analog signal.

Furthermore, the check period of the binary level of the analog signal is determined successively based on the hi-level check signal and the lo-level check signal, thereby enabling a correct determination of the binary level of the analog signal even when the transmission side and the reception side of the communication system use respectively different operation clocks.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the accompanying drawings. In the embodiments, a keyless entry system is described as an example of a vehicle communication system. The keyless entry system in the present embodiment may also be called as a remote keyless entry (RKE).

First Embodiment

Figure 1:
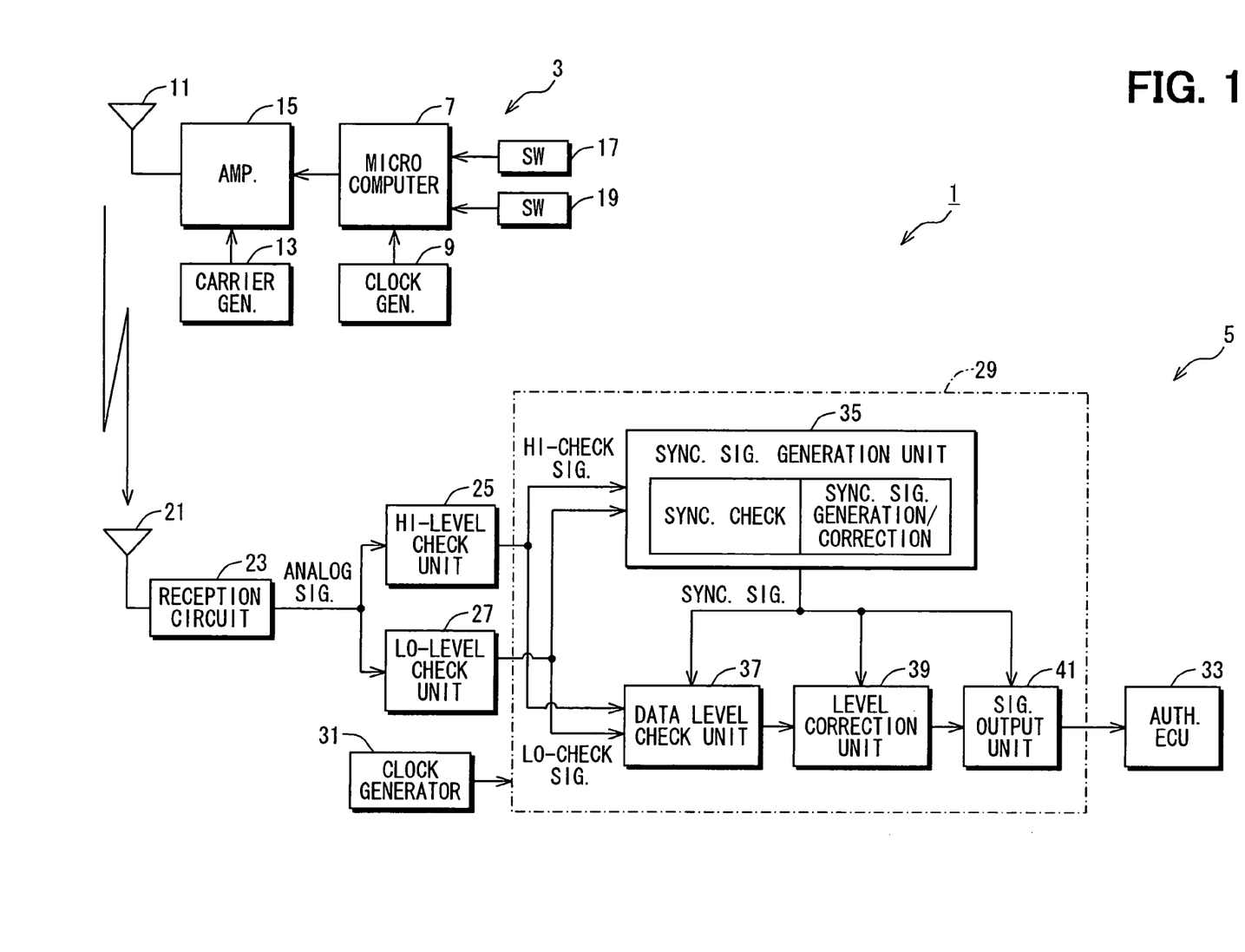
FIG. 1 shows a block diagram of a keyless entry system in a first embodiment of the present disclosure.

As shown in FIG. 1, a keyless entry system 1 in a first embodiment includes an electronic key 3 that is used as a transmitter by a user of a vehicle and a vehicle unit 5 that is disposed on the vehicle.

The electronic key 3 includes a microcomputer 7 for controlling a function of electronic key 3, a clock generation unit 9 for generating a clock of the microcomputer 7, a carrier generation unit 13 for generating and outputting a sine wave that is used as a carrier wave of a radio signal in a predetermined frequency (e.g., 300 MHz in the present embodiment), a modulation amplifier 15 for performing an analog modulation (e.g., an AM modulation in the present embodiment) of the carrier wave by using a digital signal outputted from the microcomputer 7 and for providing a modulated signal to an antenna 11 after modulation to be transmitted as the radio signal, a button type lock switch 17 for locking doors of the vehicle, and a button type unlock switch 19 for unlocking the doors.

When the microcomputer 7 detects that the switch 17 is pushed for being turned on, the microcomputer 7 outputs to the modulation amplifier 15 the digital signal including a lock order code for providing a door locking instruction to the vehicle unit 5. Then, the radio signal which modulates the carrier wave by using the digital signal including the lock order code will be transmitted from the antenna 11.

In addition, when the microcomputer 7 detects that the switch 19 is pushed and is turned on, the microcomputer 7 outputs to the modulation amplifier 15 the digital signal including an unlocking order code for providing door unlocking instruction to the vehicle unit 5. Then, the radio signal which modulates the carrier wave by using the digital signal including the unlock order code will be transmitted from the antenna 11.

Still further, in the present embodiment, the microcomputer 7 outputs the digital signal that is generated from the digital data of an object of transmission (i.e., the digital data including the lock/unlock order code) by using the Biphase coding as shown in FIG. 12B. In this case, the lock/unlock order code is peculiar to the vehicle which uses the electronic key 3.

On the other hand, the vehicle unit 5 includes an antenna 21 for receiving the radio signal from the electronic key 3, a reception circuit 23 for de-modulating and for outputting the signal received by the antenna 21 (e.g., AM de-modulation in the present embodiment), a hi-level check unit 25 for outputting a digital signal of binary level in a digitally shaped wave form that is identical with the digital signal coded by the electronic key 3, a lo-level check unit 27, a signal processing circuit 29, a clock generator 31 for generating and outputting an operation clock of the signal processing circuit 29, and an authentication ECU 33 for receiving the digital signal after wave shaping from the signal process circuit 29.

The authentication ECU 33 further demodulates (decodes) the digital signal from the signal processing circuit 29 and restores the digital data (i.e., reception data hereinafter) of the NRZ form represented by the digital signal. Then, the ECU 33 determines whether a code included in the reception data agrees with a lock order code or an unlock order code (i.e., the lock/unlock order code which is peculiar to the vehicle having the ECU 33) memorized in ECU 33. When the code agrees with the memorized one, the ECU 33 drives a door lock actuator (not shown in the figure) for locking/unlocking the doors. In other words, all doors are put in a locked condition when the code in the reception data is the lock order code, and all doors are put in an unlocked condition when the code in the reception data is the unlock order code.

Therefore, by using the ECU 33, the user of the vehicle can perform locking/unlocking of a door intentionally by pushing the switches 17, 19 of a proper electronic key 3.

In addition, the authentication ECU 33 is operated on a clock generated by a different clock from the clock generator 31. In other words, the ECU 33 and the signal processing circuit 29 operate on respectively different clocks without synchronization.

Next, the hi-level check unit 25, the lo-level check unit 27 and the signal processing circuit 29 are described.

First, each of the hi-level check unit 25, the lo-level check unit 27 receives an input of the analog reception signal from the reception circuit 23.

Figure 2:
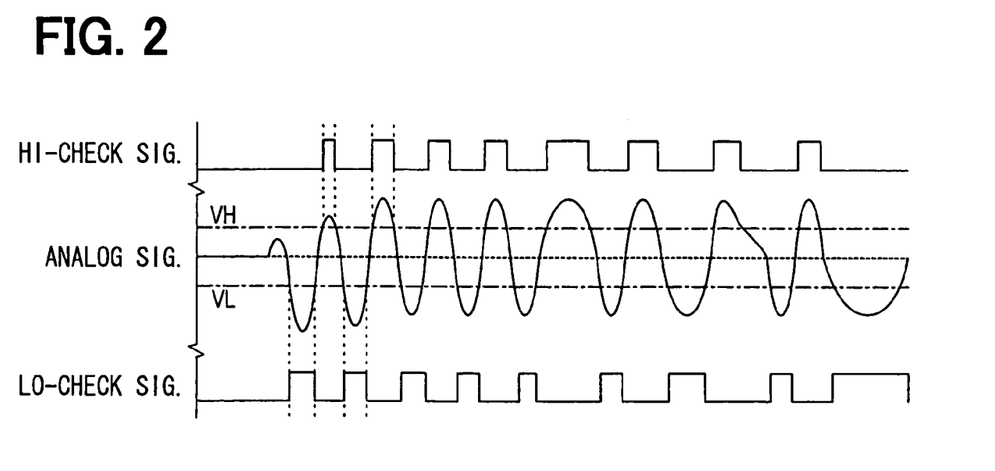
FIG. 2 shows an illustration of a hi-check signal and a low-check signal as well as an analog signal.

Then, the hi-level check unit 25 compares, as shown in FIG. 2, the analog reception signal with a threshold VH (i.e., a hi-level threshold hereinafter) in terms of signal level, and outputs a hi-level check signal as shown in FIG. 2. More practically, when the "the analog reception signal>VH," the hi-level signal is put in an active level (i.e., in a HI in the present embodiment), and when "the analog reception signal<VH," the hi-level check signal is put in a LO level.

Similarly, the lo-level check unit 27 compares, as shown in FIG. 2, the analog reception signal with a threshold VL (i.e., a lo-level threshold hereinafter) in terms of signal level, and outputs a lo-level check signal as shown in FIG. 2. More practically, when the "the analog reception signal<VL," the lo-level signal is put in an active level (i.e., in a HI in the present embodiment), and when "the analog reception signal>VL," the lo-level check signal is put in a LO level.

In this case, for example, each of the hi-level check unit 25 and the lo-level check unit 27 may be composed by using a comparator. In addition, in the present embodiment, the hi-level threshold VH is set to the voltage that is higher than a center voltage of amplitude of the analog reception signal, and the lo-level threshold VL is set to the voltage that is lower than the above center voltage.

Then, as shown in FIG. 1, the hi-check signal output from the hi-level check unit 25 and the lo-check signal output from the lo-level check unit 27 are inputted to the signal processing circuit 29. The signal processing circuit 29 includes a sync. signal generation unit 35, a data level check unit 37, a level correction unit 39, and a signal output unit 41.

The sync. signal generation unit 35 is, based on the hi-check signal and the lo-check signal generated from the analog signal, a unit that successively determines a check period of the binary level (i.e., HI or LO) of the analog signal. The generation unit 35 generates a synchronization signal that represents a period (or a length) and a phase of each of the check periods.

Figure 3:
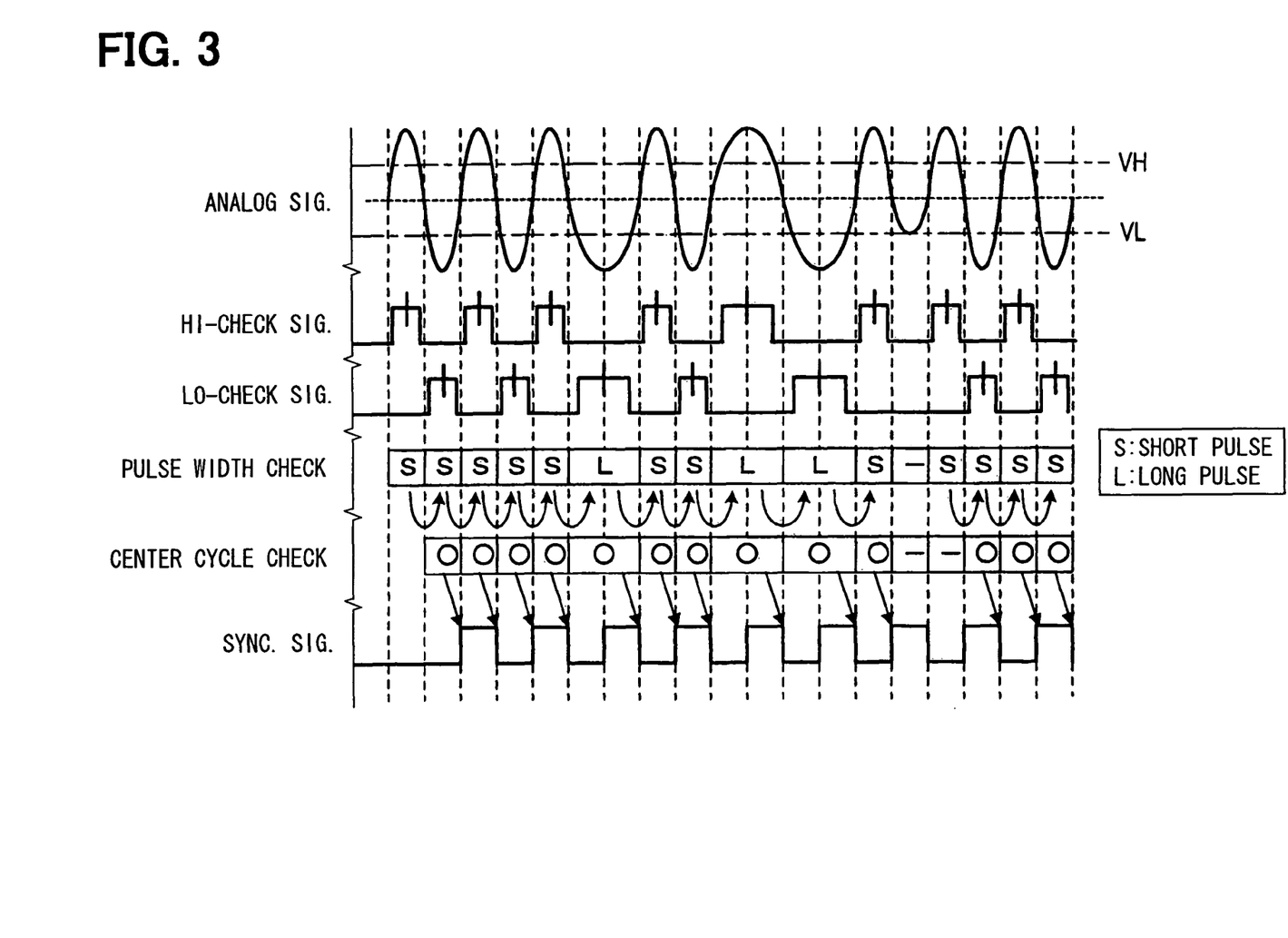
FIG. 3 shows an illustration of a process executed in a sync signal generation unit.

The process performed in the sync. signal generation unit 35 is described in the following with reference to FIG. 3. In this case, as shown in FIG. 3, the period between each of level-change edges in the sync. signal is used as the check period in the present embodiment. In the following description, "bit" is a time width of one bit, and "½ bit" is a time width that is one half of time for 1 bit, and "¼ bit" is a time width that is one quarter of time for 1 bit, and "¾ bit" is a time width that is three quarters of time for 1 bit. Further, the hi-check signal and the lo-check signal are designated as check signals in general.

First of all, in the case of Biphase coding, the check period may have the time width of the ½ bit because one bit of data is represented by the signal level in two ½ bit periods that constitute a former and a latter half of the one bit. Though the check period has to be in synchronization with the timing of each bit in the reception signal, the check period for sync. signal generation is determined by extracting information of the period length and the phase of ½ bit equivalent period from the analog reception signal (i.e., from the hi-check signal and the lo-check signal in reality) because the keyless entry system in the present disclosure operates the electronic key 3 on a transmission side and the vehicle unit 5 on a reception side by respectively different clocks with respectively different deviations and fluctuations.

Therefore, the sync. signal generation unit 35 performs the following processes of <1> to <4>.

<1> Based on sampling of the hi-check signal and the lo-check signal, the generation unit 35 calculates a pulse width (i.e., a high level time) of each of the sampled check signals.

<2> When the pulse width calculated in the above process in <1> is within a predetermined range that can be considered as a one bit equivalent width (one bit tolerance hereinafter), the pulse portion is determined as a "valid long pulse." When the pulse width calculated in the above process in <1> is within a predetermined range that can be considered as a ½ bit equivalent width (half bit tolerance hereinafter), the pulse portion is determined as a "valid short pulse" (refer to the fourth line in FIG. 3). In addition, the valid long pulse and the valid short pulse are designated as valid pulses in general.

<3> When the check signals determined to be valid in the above process in <2> is inputted in an alternating manner such as the hi-check signal followed by the lo-check signal or the lo-check signal followed by the hi-check signal, the period between two center points of the pulse width of the check signals (center point width hereinafter) is measured by sampling, and the measurement of the center point width is compared with the predetermined period in Table 1 in the following (refer to the fifth line in FIG. 3).

TABLE 1

| Previous pulse | Current pulse | Predetermined period (Center point width) |
| --- | --- | --- |
| Short pulse | Short pulse | ½ bit width tolerance or less |
| Short pulse | Long pulse | ¾ bit width tolerance or less |
| Long pulse | Short pulse | ¾ bit width tolerance or less |
| Long pulse | Long pulse | 1 bit width tolerance or less |

In this case, in Table 1, "¾ bit width tolerance" is the range that can be considered to be the width for ¾ bit. When 1 bit width tolerance, ¾ bit width tolerance and ½ bit width tolerance are respectively designated as H [1], H [¾], and H [½], a relationship between those parameters is defined as H [1]>H [¾]>H [½]. In addition, "O" mark in the fifth one in FIG. 3 means that the center point width fulfills the predetermined period length of Table 1.

<4> When the pulse width is determined to be valid and the center point width of the valid pulse is determined to fulfill the predetermined period length in Table 1, the check signal is determined as "In-sync," and the next level change timing (logic change point) of the sync. signal is set according to the timing in Table 2 in the following (refer to the last line in FIG. 3). In this manner, an edge interval of the sync. signal is corrected. Further, when the signal is not determined "In-sync," the next level change timing of the sync. signal is set at the ½ bit time after the previous level change timing. In other words, the edge interval of the sync. signal is not corrected in this case, with the inversion of the HI-LO level at each of the time width of ½ bit.

TABLE 2

| Current pulse | Logic change point in sync. signal |
| --- | --- |
| Short pulse | ¼ bit time width from the center point of the current pulse |
| Long pulse | ½ bit time width from the center point of the current pulse |

By repeating the processes in <1> to <4>, the timing of the input signal is corrected one by one according to the sync. signal, thereby always providing a stable check period (i.e., the check period in synchronization with each bit of the reception signal).

In this case, only one of the short pulse or the long pulse may be determined for the simplicity of the processing.

On the other hand, the data level check unit 37 is a unit that determines the binary level of the analog reception signal based on the hi/lo-check signal; the binary level of the analog signal is designated as data level because the binary level is used for determining the logical value of each bit in the analog signal. The content of the processing performed by the data level check unit 37 is described with reference to FIGS. 4A and 4B in the following.

Figure 4A:
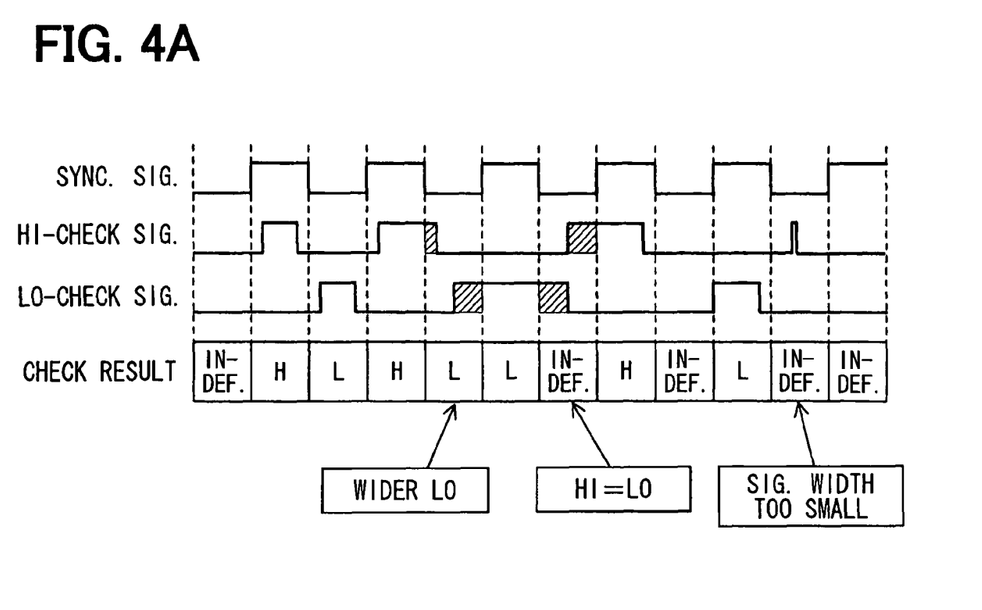
FIG. 4A shows an illustration of a process executed in a data level check unit.

The data level check unit 37 measures the high level time of the hi-check signal and the lo-check signal for each of the check periods that is defined as a period between the edge intervals of the sync. signal, and compares the measurements of the two check signals as shown in FIG. 4A for basically determining the data level of the analog reception signal as identical to the measurement having a longer period of the high level. In other words, when the high level time of the hi-check signal in the check period (hi-signal width hereinafter) and the high level time of the lo-check signal in the check period (lo-signal width hereinafter) are compared, the check unit 37 determines the data level is high (H) when the former one is longer, or determines the data level is low (L) when the latter is longer. However, the data level is determined as indefinite when the hi-signal width and the lo-signal width are same, or when both signal widths are substantially equal to zero. That is, when the following inequality is fulfilled, the data level is determined as indefinite.

[Inequality]|Hi-signal width−Lo-signal width|<Predetermined Value

Figure 4B:
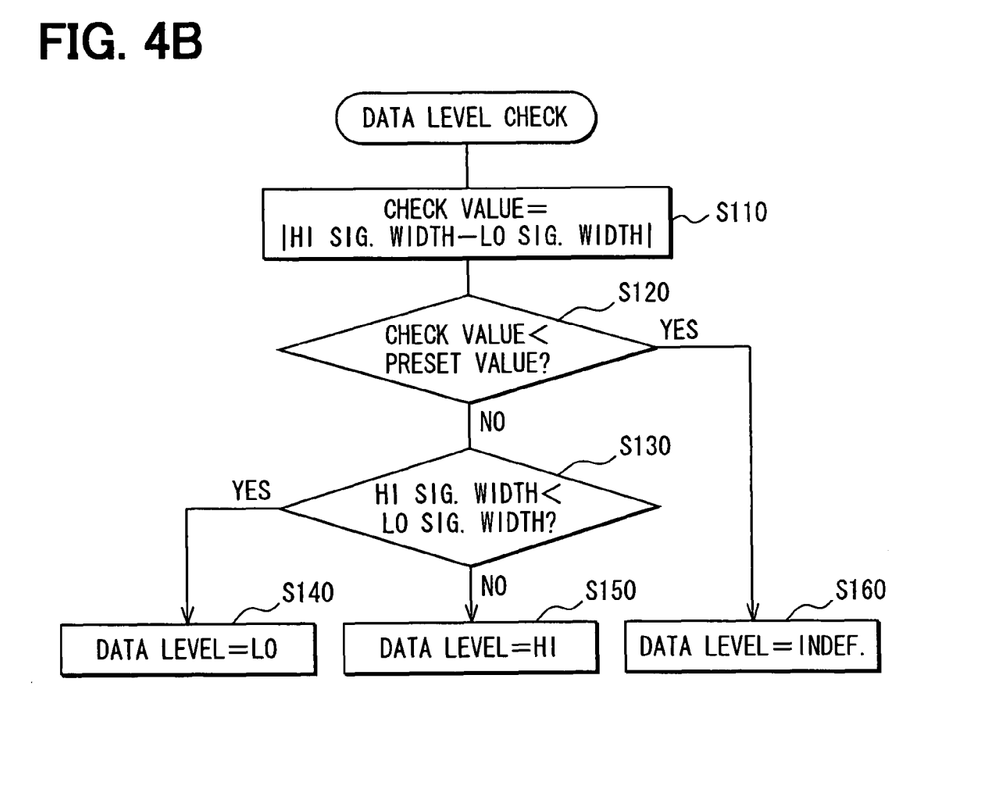
FIG. 4B shows a flowchart of a process executed in the data level check unit.

More practically, the data level check unit 37 performs a data level check process as shown in FIG. 4B for each check period.

That is, the hi-signal width and the lo-signal width are measured, and a check value is calculated as an absolute value of the two signal width measurements (S110) in the first place.

Then, when the check value is not smaller than the predetermined value (S120:NO) and the hi-signal width is smaller than the lo-signal width (S130:YES), the data level is determined to be low (S140).

When the check value is not smaller than the predetermined value (S120:NO) and the hi-signal width is not smaller than the lo-signal width (S130:NO), the data level is determined to be high (S150).

Further, when the check value is smaller than the predetermined value (S120:YES), the data level is determined to be indefinite (S160).

Through the process described above, an erroneous determination due to a noise in the signal is prevented, and the data level of each check period is correctly determined even when a switch portion between the high and the low is unstable due to jitter or a change in duty cycle.

Next, the level correction unit 39 is a unit that corrects the check result of indefinite that is derived from the data level check unit 37 to have one of the high value or the low value based on the check result of the check period and the rule of coding. The process performed in the correction unit 39 is described with reference to FIGS. 5 and 6.

First, in the case of the Biphase coding in the present embodiment, a starting level of the next bit is inverted from an ending level of an immediately previous bit by the rule that governs the coding. Therefore, when the check result of the data level is set as indefinite, the level correction unit 39 corrects the indefinite level to take one of the high value or low value according to the table shown in FIG. 5A. That is, the data level is determined to be an inverted level of the check period that corresponds to the latter half of the previous bit.

Figure 5A:
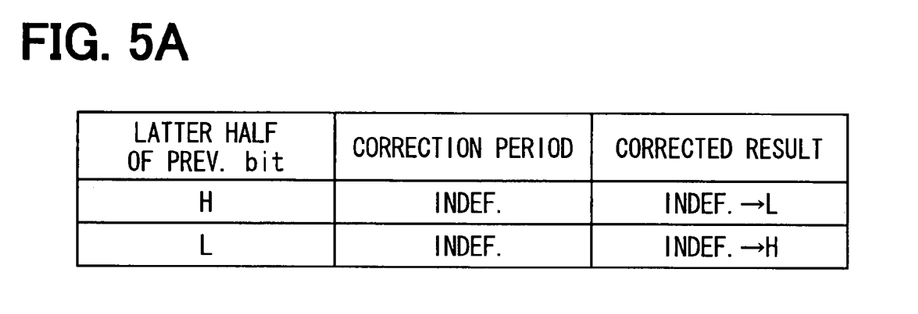
FIGS. 5A and 5B show correction rules used in a level correction unit.
Figure 5B:
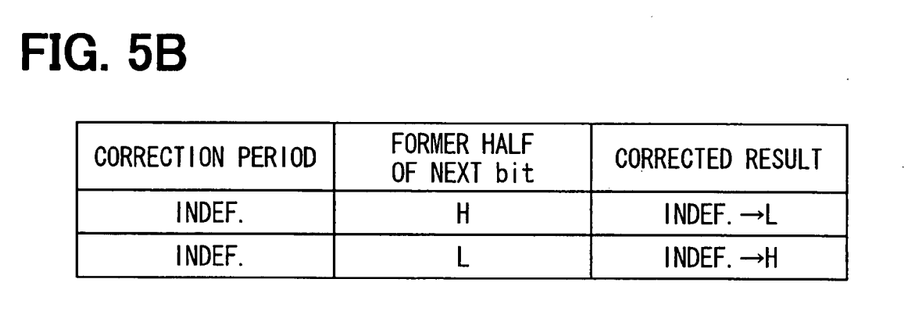

Further, when the check result of the data level in the check period that corresponds to the latter half of the bit is indefinite, the level correction unit 39 corrects the indefinite level to take one of the high value or low value according to the table shown in FIG. 5B. That is, the data level is determined to be an inverted level of the check period that corresponds to the former half of the next bit.

Figure 6A:
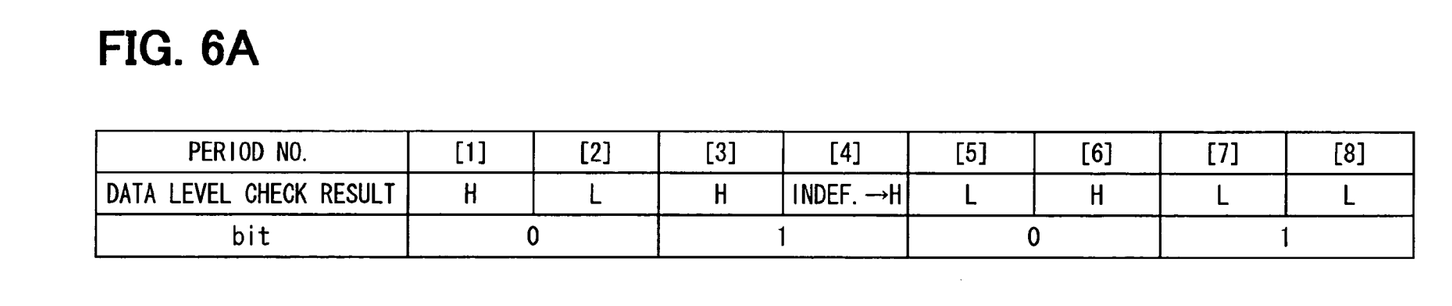
FIGS. 6A and 6B show correction results of the correction rules applied in a level correction unit.
Figure 6B:
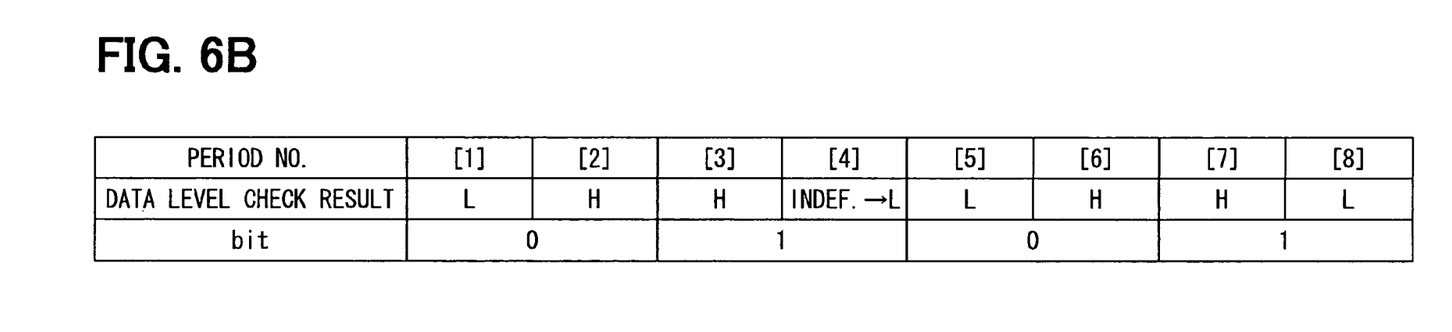

Therefore, as shown in FIG. 6A, in a case that the first bit is 0 due to high to low change and the following bits are 1-0-1, even when the check period 4 is determined to be indefinite due to an influence of a noise or the like, the indefinite level of the check period 4 is corrected to be high based on an estimation that the check period 4 has the inverse level of the check result of the check period 5 (i.e., a former half of the next bit) because the check period 4 is the latter half of the bit.

In addition, when the Manchester coding is adopted, the coding obeys a rule that the data level is inverted in the former and the latter haves of each bit. Therefore, when the check result of the latter half of the bit is indefinite, the level correction unit 39 corrects the indefinite to be an inverted level of the check result of the former half of the same bit, and when the check result of the former half of the bit is indefinite, the level correction unit 39 corrects the indefinite to be an inverted level of the check result of the latter half of the same bit. Therefore, for example, when the check result of the check period 4 is indefinite in FIG. 6B, the indefinite level is corrected to be low based on the check result of the check period 3.

Next, the signal output unit 41 outputs the binary level signal of high or low that represents the check result of the data level check unit 37 in synchronization with the level change timing of the sync. signal (a switch timing of the check period). That is, as shown in FIG. 6A, each of the binary level (i.e., high or low) of the check results memorized in a time series is successively output from an output terminal of the signal in an alternating manner that switches between two levels at the level change timing of the sync. signal.

Further, the signal output unit 41 may be composed by a shift register or the like. In addition, when the check result after the correction by the level correction unit 39 is indefinite (i.e., when a pattern that cannot be corrected by the correction unit 39 to have the high/low level is generated), the pattern of the indefiniteness may be configured to be always output as one of the high and the low level. Furthermore, when two indefinite level periods occurred in succession, that is, when the indefinite occupies the period of one bit, the period may be determined as "no data," and the sync. signal generation unit 35 may be configured to be restarted.

The binary level signal from the signal output unit 41 is inputted to the authentication ECU 33 as the digital signal after wave shaping that is mentioned above. Then, the ECU 33 restore the reception data by de-modulating the digital signal derived from the output unit 41 for performing the check of the coding described above.

In the first embodiment, the hi-level check unit 25 may be considered as an equivalent of a first signal output unit, and the lo-level check unit 27 may be considered as an equivalent of a second signal output unit, and the sync. signal generation unit 35 may be considered as an equivalent of a determination period decision unit, and the data level check unit may be considered as an equivalent of a level decision unit, and the level correction unit 39 may be considered as an equivalent of a level correction unit, and the signal output unit 41 may be considered as an equivalent of a signal output unit, and the authentication ECU 33 may be considered an equivalent of a decoding unit.

The vehicle unit 5 of the keyless entry system 1 in the above description determines the data level of the analog reception signal based on the hi-check signal from the hi-level check unit 25 and the lo-check signal from the lo-level check unit 27 by using the data level check unit 37 in the signal processing circuit 29, thereby enabling a data level determination of the analog reception signal according to the high level threshold VH and the low level threshold VL. Therefore, the data level is correctly determined.

Further, the indefinite check result of a certain check period is corrected by the level correction unit 39 based on the coding rule and the check result of other check period to have one of the high and low levels.

Therefore, even when the wave form of the analog reception signal is distorted under an influence of noise or the like, the check result of the data level of the reception signal is correctly determined, thereby preventing an erroneous restoration result of the reception data performed in the authentication ECU 33 based on the check result.

Furthermore, in the present embodiment, the data level of the analog reception signal is correctly determined due to the successive determination of the check period for determining the data level based on the hi-check signal and the lo-check signal by the sync. signal generation unit 35 though the transmission side and the reception side are operated by respectively different clocks for performing communication.

Therefore, the vehicle unit 5 acquires the data from the electronic key 3 correctly even when the analog reception signal is distorted under the influence of the noise.

Second Embodiment

The second embodiment of the keyless entry system is described in the following. The description in the following uses the like number for the like parts as used in the first embodiment. The same manner also applies to the other subsequent embodiments described thereafter.

Figure 7A:
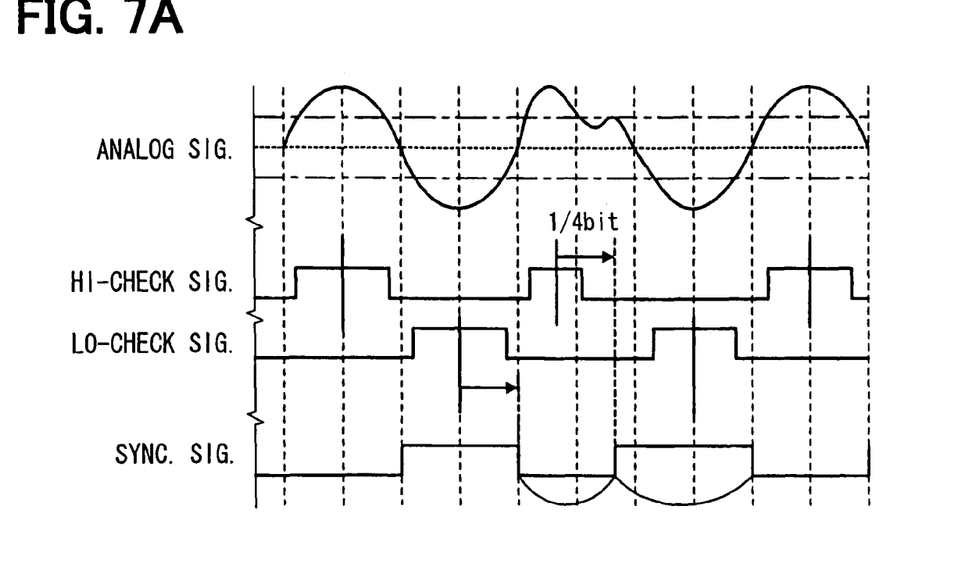
FIGS. 7A and 7B show time charts of processing in the sync signal generation unit in a second embodiment of the present disclosure.

The problem to be solved in the second embodiment is explained with reference to FIG. 7A. The illustration in FIG. 7A shows a series of the "valid short pulses" (refer to the above described in <2>) with a partial distortion in the analog reception signal.

In this case, when an interval between the center point of the pulse width of the hi-check signal that corresponds to the distortion in the analog reception signal (the center point of the pulse in the middle of the figure is designated as "a distorted center point" hereinafter) and the center point of the previous lo-check signal (the length between the center points) is within a ½ bit width tolerance, the operation in the above description <4> determines as "In-sync," and the next level change timing of the synchronization signal is set at the timing of ¼ bit width from the distorted center point (refer to Table 2).

Then, a big duty cycle change appears in the synchronization signal, and the binary level signal from the signal output unit 41 to the authentication ECU 33 in synchronization with the edge of the level change (the digital signal after form shaping) also suffers from jitter or a bit-duty cycle change. That is, a continuation time of each level of the binary level signal fluctuates largely.

Therefore, when such a big fluctuation appears, the authentication ECU 33 may not accurately restore the digital data of NRZ format from the binary level signal. That is, the authentication ECU 33 may erroneously determine the logical value of the bit that fluctuated largely in the continuation time of a certain level of the bit in the binary level signal due to the large fluctuation of the edge interval of the synchronization signal. This is because the authentication ECU 33 determines the bit 1 and the bit 0 based on the measurement of the hi-time and lo-time by sampling the binary level signal from the signal output unit 41 by using its own operation clock.

Thus, the keyless entry system in the second embodiment, in comparison with the one in the first embodiment, chooses the level change timing of the sync. signal so as to make the amount of change of the edge interval of the sync. signal to be within a predetermined value when the sync. signal generation unit 35 in the signal processing circuit 29 sets the next level change timing of the sync. signal based on the "In-sync" determination in the process in <4> described above (i.e., when the edge interval of the sync. signal is corrected).

That is, the sync. signal generation unit 35 calculates, as shown in step S210, the time ta of the center point of the pulse of the check signal that is determined to be valid in the current determination in the operation in <2> described above (refer to FIG. 7B). For example, the time ta is calculated as the average of a count value CT1 of a free-run counter at the start time of the current pulse and a count value CT2 of the free-run counter at the end time of the current pulse.

Figure 7B:
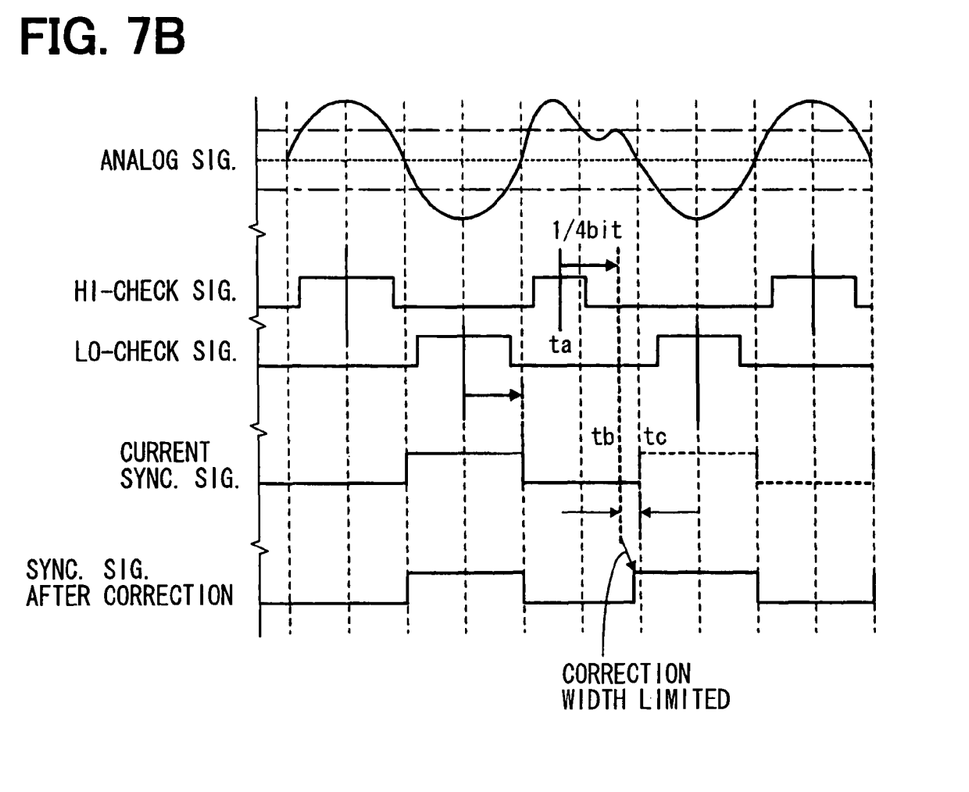
Figure 8:
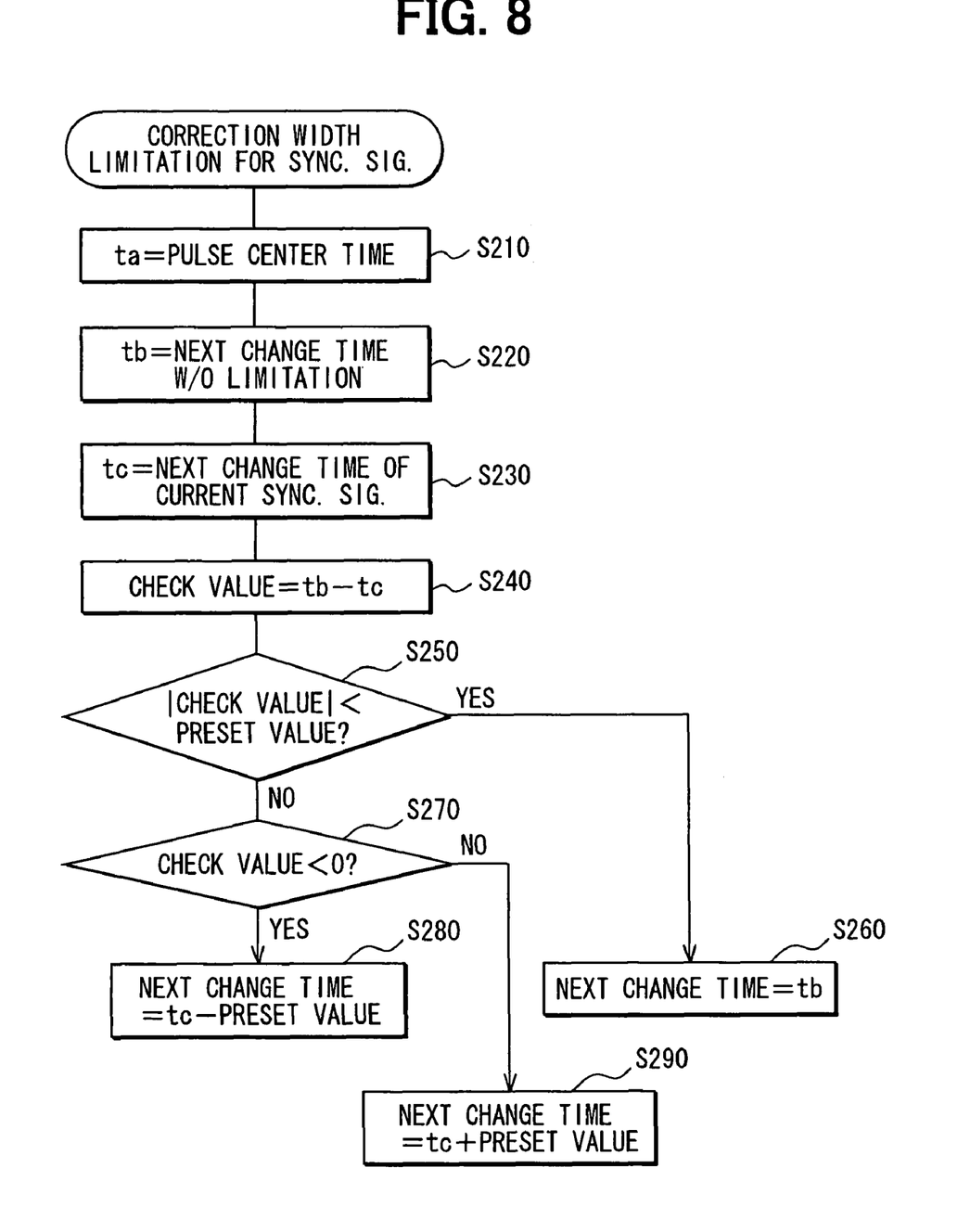
FIG. 8 shows a flowchart of processing in the sync signal generation unit in the second embodiment.

Then, as shown in step S220, the next level change time tb for a case where the amount of change of the edge interval of the sync. signal is calculated according to Table 2 (refer to FIG. 7B). For example, when the current pulse is the valid short pulse, the time tb is calculated in the following manner. That is, $tb = ta +$ a count value of the free-run counter equivalent to the ¼ bit value Further, when the current pulse is the valid long pulse, the time tb is calculated in the following manner. That is, $tb = ta +$ a count value of the free-run counter equivalent to the ½ bit value Then, as shown in step S230, the next level change time tc is determined for a case where the edge interval of the sync. signal is not corrected (refer to FIG. 7B). For example, the time tc is calculated by adding the count value of the free-run counter equivalent to the ½ bit value to the count value of the free-run counter at the time of the previous level change of the sync. signal.

Then, as shown in steps S240 and S250, by using the check value "tb−tc," the absolute value of the check value is determined as to whether it is smaller than the predetermined value. When the absolute value |tb−tc| is smaller than the predetermined value, the next level change time is set to the time tb as shown in step S260. That is, in this case, the next level change time is set to an originally determined timing as shown in Table 2.

On the other hand, when the absolute value of the check value (i.e., |tb−tc|) is not smaller than the predetermined value, the check value itself is compared with the value of zero. When the check value is smaller than zero, the next level change time is set to an earlier time prior to the time tc by the predetermined period (i.e., tc−a predetermined value) as shown in step S280. When the check value is equal to or greater than zero, the next level change time is set to a later time after the time tc by the predetermined period (i.e., tc+a predetermined value).

Then, in this manner, the change value (the correction value) of the edge interval of the sync. signal is restricted within the predetermined value in a single correction process as shown in FIG. 7B in the second embodiment. In other words, the next edge interval is set so as to have the amount of change between the current edge interval and the next edge interval in the sync. signal to be within the predetermined value. Further, in this case, the illustration in FIG. 7B shows the process in step S280 described above.

Therefore, in the vehicle unit 5 of the present embodiment, the authentication ECU 33 accurately restores the digital data in the NRZ format based on the binary level signal derived from the signal output unit 41. In this case, the restriction on the amount of change of the edge interval (i.e., the check period) of the sync. signal indicates that a temporary out-of-sync condition is generated in terms of the determination of the data level of the analog reception signal. However, the temporary out-of-sync condition is considered as an equivalent of a small jitter at the data level check unit 37, thereby providing no significant change for the data level check result.

Third Embodiment

The level correction unit 39 corrects the indefinite level to either of the hi or low level by applying the rule illustrated in the tables of FIGS. 5A and 5B based on the assumption that a division of a bit in the analog reception signal is determined (i.e., in the present embodiment, which check period corresponds to the former half of the bit and which check period corresponds to the latter half of the bit).

However, when a communication system that assumes no preamble (i.e., a dummy data that precedes a real data content, which is made up from a series of 0's or 1's), it is not assured that the division of the bit is determined in the first place.

Figure 9A:
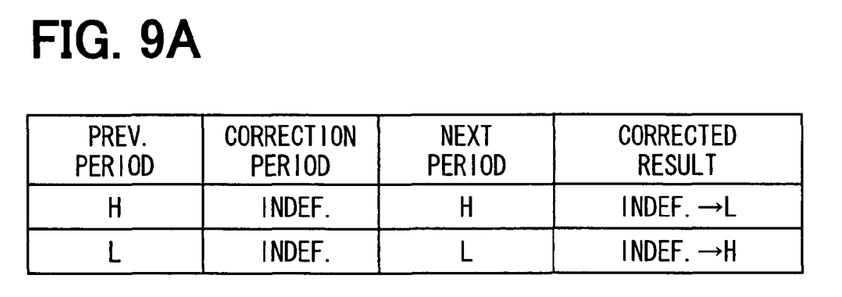
FIGS. 9A, 9B, 9C show correction rules and correction results for indefinite bit divisions.
Figure 9B:
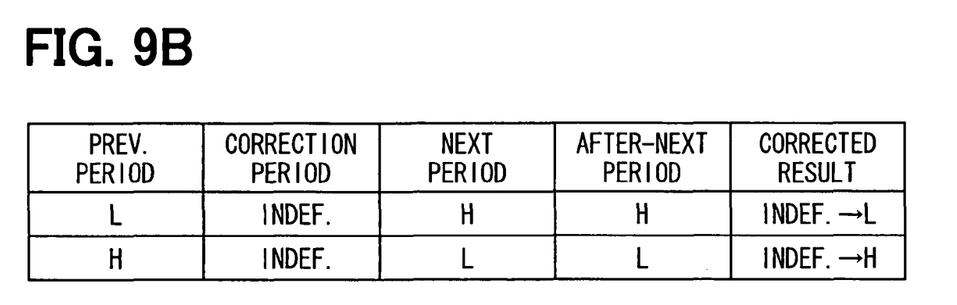

Therefore, the level correction unit 39 of the vehicle unit 5 in the third embodiment of the present disclosure corrects the indefinite level by using the correction logic illustrated in FIGS. 5A and 5B when the bit division is determined, and corrects the indefinite level by using the correction logic in FIGS. 9A and 9B when the bit division is not clearly determined. In the following description, the check period may be designated as a period. Further, the indefinite period is the check period that the data level check unit 37 determined as indefinite, or in other words, the check period to be corrected.

Thus, as shown in FIG. 9A, when the previous period and the next period of the indefinite period has the same check level, the level of the indefinite period is inverted from the level of the previous/next period, because the rule of the Biphase coding that the end level of the previous bit is an inverse of the start level of the next bit leads to a rule of thumb that there should be no three successive periods that have the same level.

Further, as shown in FIG. 9B, when the previous period and the next period have respectively different check levels, the four successive periods are measured for correcting the indefinite level based on the above rule that there should be no three successive periods that have the same level.

In this case, as apparently recognized from a comparison between FIGS. 5A/5B and FIGS. 9A/9B, when the bit division is not determined, the correction logic is not only complicated but also, as shown in FIG. 9B for example, is deteriorated to make it impossible to correct the indefinite period when the second period after the indefinite period is also determined as indefinite. In this case, though the deterioration of the correction capability is prevented by increasing the number of the check periods up to six periods or more for finding a logic value 1 equivalent portion (i.e., H to H, or L to L in the Biphase coding), the delay time of the correction is increased as a result.

Figure 10:
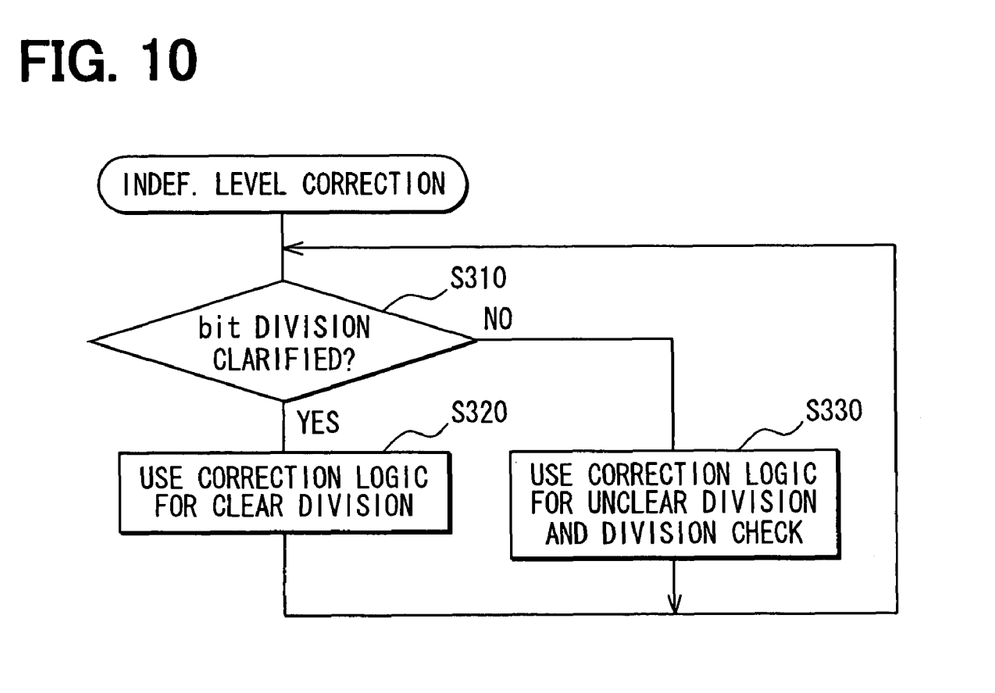
FIG. 10 shows a flowchart of operation mode change in the level correction unit in a third embodiment of the present disclosure.

Therefore, in the third embodiment, the level correction unit 39 switches the operation mode according to the condition whether the bit division is determined or not as shown in FIG. 10.

Figure 9C:
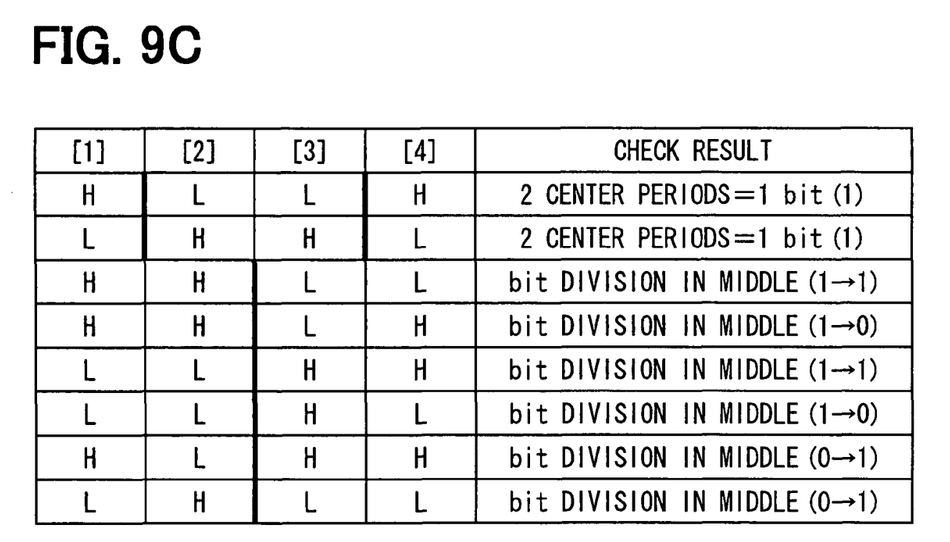

That is, the level correction unit 39 corrects the indefinite level by using the logic shown in FIG. 9A or FIG. 9B when the bit division is not determined (S310:NO), and determines the bit division by using the determination logic shown in FIG. 9C after observing the check result of the 4 periods after the correction (S330). Then, the level correction unit 39 corrects the indefinite level by using the correction logic in FIG. 5A or FIG. 5B (S320) when the bit division is determined after the check process (S310:YES).

As a result, the indefinite level is efficiently corrected by quickly ending the deterioration of the correction capability without causing a big delay.

The correction results by the correction logic in FIG. 9B are listed in FIG. 9C. That is, the correction results by the logic FIG. 9B correspond to either of a pattern in the third line or the fifth line in FIG. 9C. Therefore, the bit division may be simultaneously determined when the correction of the indefinite level is performed by the correction logic in FIG. 9B.

(First Modification)

As described in the third embodiment, the big process delay in the correction of the indefinite level is prevented by observing four check periods at the same time.

Therefore, the level correction unit 39 may be configured to always observe the four periods at the same time regardless of the determination of the bit division, or regardless of performing either of the correction of the indefinite level or the determination of the bit division. That is, the level correction unit 39 determines the bit division while performing the correction of the indefinite level to correspond to one of the plural patterns in FIG. 9C. In addition, only the determination logic may be switched according to the condition of the correction.

In this manner, the structure of the level correction unit 39 is simplified, thereby saving the number of gates in the logic circuit when the signal processing circuit 29 is composed by the logic circuit, or thereby reducing the memory size to be allocated for software when the signal processing circuit 29 is composed by a microcomputer.

(Second Modification)

Figure 11:
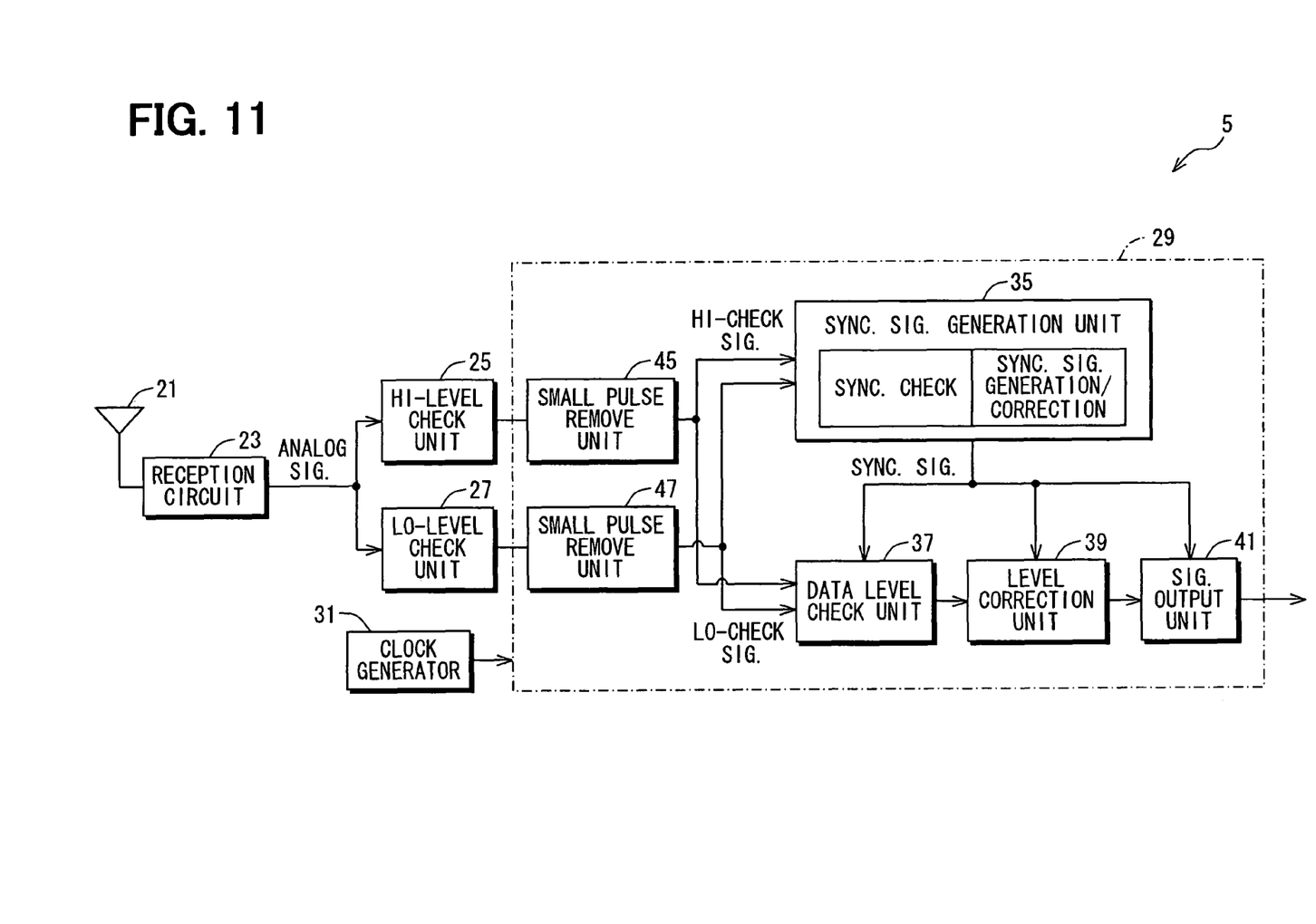
FIG. 11 shows a block diagram of a modification of the keyless entry system.

The vehicle unit 5 in each of the above embodiments may be changed to the one that is shown in FIG. 11. That is, small pulse remove units 45, 47 may be disposed for removing a small pulse from the hi-check signal from the hi-level check unit 25 and the lo-check signal from the lo-level check unit 27. The small pulse is the pulse having a width of equal to or smaller than a predetermined width (e.g., the pulse having the width that corresponds to one clock cycle derived from the clock generator 31.

The use of the small pulse remove units 45, 47 enables a more accurate and easy determination in a latter processes (i.e., the processes in the sync. signal generation unit 35 and the data level check unit 37).

Further, the small pulse remove unit 45, 47 may be composed as a simple filter circuit that sets, for example, the output level to take the same level as the input level when the input level takes the same level in two or more successive cycles of input.

Although the present invention has been fully described in connection with the preferred embodiment thereof with reference to the accompanying drawings, it is to be noted that various changes and modifications will become apparent to those skilled in the art.

For example, the present invention can be applied to the smart entry system as well as the keyless entry system, and can also be applied to a tire pressure monitoring system (TPMS) that transmits tire pressure data from a transmitter on each of the tires of a vehicle for tire pressure monitoring.

Further, the present invention may be applied to an apparatus that receives the radio signal transmitted from the apparatus disposed on the vehicle body. For example, the present invention may be applied to the reception unit on the electronic key that is carried by a user of a vehicle when the key is a part of a radio communication system including the key and the vehicle unit.

Furthermore, the signal processing circuit 29 may be composed as a logic circuit, or may be composed as a part that uses a microcomputer.

Furthermore, the hi-level check unit 25 and the lo-level check unit 27 may use the same value for the thresholds VH, VL.

Furthermore, the signal processing circuit 29 and the authentication ECU 33 may be integrated to operate on the same clock that is generated by the ECU 33. In this case, the signal output unit 41 may be deleted for directly restoring the reception data from the check result of the data level after correcting the indefinite level by the level correction unit 39.

Furthermore, the Biphase coding in each of the above embodiments may be replaced with Manchester coding, and other coding methods such as BPSK modulation coding, Sub-carrier Manchester coding or the like.

Such changes and modifications are to be understood as being within the scope of the present invention as defined by the appended claims.

What is claimed is:

1. A receiving unit of a vehicle communication system utilizing a coding scheme, wherein the coding scheme generates a binary level change between a high level and a low level at least one of in a middle of each bit of digital data and at an end of each bit of digital data, wherein the digital data is transmitted by having a carrier wave modulated by the coding scheme that encodes the digital data into digital signal, wherein the transmitted digital signal transmitted from a transmitter is received for de-modulation, and wherein a binary level of one of the high level and the low level of a de-modulated analog demodulation signal is determined for restoring the digital data based on a determination result of the demodulation signal, the receiving unit comprising:
   a first signal output unit that outputs a high level decision signal in an active level when the analog demodulation signal is higher in level after comparing the analog demodulation signal and a high level threshold;
   a second signal output unit that that outputs a low level decision signal in the active level when the analog demodulation signal is lower in level after comparing the analog demodulation signal and a low level threshold;
   a synchronization signal activation unit generating a synchronization signal based on the high level decision signal and the low level decision signal, whereby a determination period of the binary level of the analog demodulation signal is determined as a period between the edge interval of the synchronization signal;
   a level decision unit that determines the binary level of the demodulation signal either as a high level, as a low level or as an indefinite level in each of the determination periods based on the high level decision signal and the low level decision signal wherein the binary level is determined as an indefinite level if the binary level of the analog demodulation signal in the determination period is determined as neither of the high level or the low level, and
   a level correction unit that corrects the indefinite level to be in either one of the high level and the low level based on a determination result of the level decision unit and a rule of the coding scheme.

2. The receiving unit of the vehicle communication system as in claim 1,
   wherein the level correction unit corrects the indefinite level based on four successive determination results by the level decision unit with no three successive determination results therein being at a same level.

3. The receiving unit of the vehicle communication system as in claim 1,
   wherein the level correction unit estimates and corrects the indefinite level to be one of the high level and the low level based on a determination result of at least one determination period that is adjacent to the determination period of the indefinite level and the rule of the coding scheme.

4. The receiving unit of the vehicle communication system as in claim 1, further comprising:
   a signaling unit that outputs in synchronization with the synchronization signal the binary level signal of one of the high and low level for showing the determination result of the level decision unit after a correction of the indefinite level by the level correction unit; and
   a decoding unit that decodes the binary level signal being output from the signaling unit to restore the digital data,
   wherein the synchronization signal activation unit is configured to determine a change timing in such a way that a change rate between the length of a current determination period and the length of the next determination period is smaller than a predetermined value when the determination period is determined.

5. The receiving unit of the vehicle communication system as in claim 1,
   wherein the level correction unit performs a bit division determination process based on a determination result of the level decision unit and a rule of the coding scheme when a bit division of the analog demodulation signal is unclear,
   wherein, when the bit division is being clarified by performing the bit division determination process, the correction of the indefinite level is performed based on a number of determination results of the level decision unit that is less than a number of determination results of the level decision unit used to effect correction of the indefinite level for a case when the bit division is unclear.

6. A receiving unit of a vehicle communication system utilizing a coding scheme, wherein the coding scheme generates a binary level change between a high level and a low level at least one of in a middle of each bit of digital data and at an end of each bit of digital data, wherein the digital data is transmitted by having a carrier wave modulated by the coding scheme that encodes the digital data into digital signal, wherein the transmitted digital signal transmitted from a transmitter is received for de-modulation, and wherein a binary level of one of the high level and the low level of a de-modulated analog demodulation signal is determined for restoring the digital data based on a determination result of the demodulation signal, the receiving unit comprising:
   a first signal output unit that outputs a high level decision signal in an active level when the analog demodulation signal is higher in level after comparing the analog demodulation signal and a high level threshold;
   a second signal output unit that that outputs a low level decision signal in the active level when the analog demodulation signal is lower in level after comparing the analog demodulation signal and a low level threshold;
   a determination period decision unit that successively determines a determination period of the binary level of the analog demodulation signal based on the high level decision signal and the low level decision signal;

a level decision unit that determines the binary level of the analog demodulation signal in each of the determination periods based on the high level decision signal and the low level decision signal along with a determination of an indefinite level when the binary level of the analog demodulation signal is determined as neither of the high level or the low level, a level correction unit that estimates and corrects the indefinite level to be one of the high level and the low level based on a determination result of the level decision unit and a rule of the coding scheme, and a signaling unit that outputs in synchronization with a change timing of the determination period the binary level signal of one of the high and low level for showing the determination result of the level decision unit after a correction of the indefinite level by the level correction unit; and a decoding unit that decodes the binary level signal being output from the signaling unit to restore the digital data, wherein the determination period decision unit is configured to determine a next determination period so that a change rate between the length of a current determination period and the length of the next determination period is smaller than a predetermined value when the determination period is determined.

7. A receiving unit of a vehicle communication system utilizing a coding scheme, wherein the coding scheme generates a binary level change between a high level and a low level at least one of in a middle of each bit of digital data and at an end of each bit of digital data, wherein the digital data is transmitted by having a carrier wave modulated by the coding scheme that encodes the digital data into digital signal, wherein the transmitted digital signal transmitted from a transmitter is received for de-modulation, and wherein a binary level of one of the high level and the low level of a de-modulated analog demodulation signal is determined for restoring the digital data based on a determination result of the demodulation signal, the receiving unit comprising:

a first signal output unit that outputs a high level decision signal in an active level when the analog demodulation signal is higher in level after comparing the analog demodulation signal and a high level threshold;

a second signal output unit that outputs a low level decision signal in the active level when the analog demodulation signal is lower in level after comparing the analog demodulation signal and a low level threshold;

a determination period decision unit that successively determines a determination period of the binary level of the analog demodulation signal based on the high level decision signal and the low level decision signal;

a level decision unit that determines the binary level of the analog demodulation signal in each of the determination periods based on the high level decision signal and the low level decision signal along with a determination of an indefinite level when the binary level of the analog demodulation signal is determined as neither of the light level or the low level, a level correction unit that estimates and corrects the indefinite level to be one of the high level and the low level based on a determination result of the level decision unit and a rule of the coding scheme, and wherein the level correction unit performs a bit division determination process based on a determination result of the level decision unit and a rule of the coding scheme when a bit division of the analog demodulation signal is unclear, wherein, when the bit division is being clarified by performing the bit division determination process, the correction of the indefinite level is performed based on a number of determination results of the level decision unit less than a number of determination results of the level decision unit utilized for a case when the bit division is unclear.

* * * * *